US011931868B2

(12) United States Patent
Shrivastava

(10) Patent No.: US 11,931,868 B2
(45) Date of Patent: Mar. 19, 2024

(54) WRENCH HEAD FOR A UNIVERSAL WRENCH

(71) Applicant: L&T TECHNOLOGY SERVICES LIMITED, Chennai (IN)

(72) Inventor: Shubham Shrivastava, Faridabad (IN)

(73) Assignee: L&T TECHNOLOGY SERVICES LIMITED, Tamil Nadu (IN)

( * ) Notice: Subject to any disclaimer, the term of this patent is extended or adjusted under 35 U.S.C. 154(b) by 196 days.

(21) Appl. No.: 17/590,850

(22) Filed: Feb. 2, 2022

(65) Prior Publication Data

US 2022/0402102 A1 Dec. 22, 2022

(51) Int. Cl.

*B25B 13/06* (2006.01)
*B25B 23/142* (2006.01)
*B25B 23/16* (2006.01)

(52) U.S. Cl.

CPC ........ *B25B 13/065* (2013.01); *B25B 23/1422* (2013.01); *B25B 23/16* (2013.01)

(58) Field of Classification Search

None

See application file for complete search history.

(56) References Cited

U.S. PATENT DOCUMENTS 3,674,070 A * 7/1972 Mahoney .............. B25B 15/001 81/185
3,859,869 A * 1/1975 Pasbrig ................. B25B 13/463 81/185
4,416,173 A * 11/1983 Rebish .................... B25B 13/58 81/DIG. 11
4,724,730 A * 2/1988 Mader ................... B25B 13/065 81/53.2
4,887,498 A * 12/1989 Zayat .................... B25B 13/105 81/DIG. 11
5,193,420 A * 3/1993 Smith .................. B25B 13/485 81/461
5,622,090 A * 4/1997 Marks ................... B25B 13/105 81/DIG. 11
5,768,961 A * 6/1998 Frawley .................. B25B 13/06 279/81
5,791,209 A * 8/1998 Marks ................... B25B 13/105 81/DIG. 11
5,806,385 A * 9/1998 Schupp ................. B25B 13/105 81/DIG. 11
6,085,619 A * 7/2000 Blake .................. B25B 23/0035 81/177.85

(Continued)

*Primary Examiner* — David B. Thomas

(57) ABSTRACT

A wrench head for a universal wrench is disclosed that may include a housing having an upper portion and a lower portion. The wrench head may further include a base plate positioned inside the housing towards the upper portion of the housing, and a plurality of push-rods positioned inside the housing. The wrench head may further include a resilient member positioned inside the housing between the base plate and the distal end of each of the plurality of push-rods. In the default position, the resilient member biases each of the plurality of push-rods, and in the retracted position, the proximal end of each of the plurality of push-rods is pushed against the resilient member to be received along with a portion of the resilient member by a compartment of the plurality of compartments defined at the bottom surface of the base plate.

10 Claims, 7 Drawing Sheets

(56) References Cited

U.S. PATENT DOCUMENTS

| | | | | | |
|---|---|---|---|---|---|
| 6,092,443 | A * | 7/2000 | Zayat, Jr. | B25B 13/105 81/DIG. 11 |
| 6,098,507 | A * | 8/2000 | Lin | B25B 13/105 81/DIG. 11 |
| 6,138,534 | A * | 10/2000 | Cho | B25B 13/105 81/DIG. 11 |
| 6,928,906 | B1 * | 8/2005 | Marks | B25B 13/105 81/DIG. 11 |
| 7,290,469 | B2 * | 11/2007 | Walters | B25B 13/105 81/DIG. 11 |
| 7,886,637 | B2 * | 2/2011 | Campbell | B25B 13/105 81/DIG. 11 |
| 9,174,327 | B1 * | 11/2015 | Christensen | B25B 13/28 |
| 10,442,063 | B2 * | 10/2019 | Wu | B25B 15/005 |
| 10,549,411 | B2 * | 2/2020 | Berman | B25B 15/007 |
| 10,589,403 | B2 * | 3/2020 | Lin | B25B 13/06 |
| 2016/0271771 | A1 * | 9/2016 | Harker | B25B 13/04 |
| 2017/0266789 | A1 * | 9/2017 | Berman | B25B 15/008 |

* cited by examiner

WRENCH HEAD FOR A UNIVERSAL WRENCH

TECHNICAL FIELD

This disclosure relates generally to hand tools, and more particularly to a wrench head for a universal wrench compatible with fasteners of different sizes and shapes.

BACKGROUND

Generally, a tool kit includes a variety of tools for different applications, the tools comprising wrenches, spanners, and screwdrivers. A wrench is designed in two-part form defining a handle of the wrench and a wrench-head also known as "socket" of the wrench. The handle provides the necessary span to generate enough torque for rotating the fastener, and the wrench-head provides for firmly coupling the wrench with the fastener throughout the operation. Typically, wrenches may include a set of interchangeable wrench-heads for turning fasteners of different shapes and sizes. The set of wrench-heads is defined by a single design and is capable of turning similarly shaped nuts or bolts. Therefore, the wrench-heads of the wrench need to be replaced every time when shifting through fasteners of different shapes and sizes. Therefore, a user must possess tool kits comprising a variety of wrench-heads. This increases the capital cost for the user as well as time consumption for performing repair operations.

Therefore, there is a need for hand tools that are configured to fasten differently shaped and sized fasteners, without requiring repeated replacement of wrench-heads. There is a further need for a hand tool that is less expensive for the user and reduces the usage and repairing time.

SUMMARY OF THE INVENTION

In an embodiment, a wrench head for a universal wrench is disclosed. The wrench head may include a housing having an upper portion and a lower portion, and a base plate positioned inside the housing towards the upper portion of the housing. The base plate has a top surface and a bottom surface. The base plate may include a plurality of compartments defined at the bottom surface of the base plate, and a plurality of push-rods positioned inside the housing, each of the plurality of push-rods having a proximal end towards the upper portion of the housing and a distal end towards the lower portion of the housing. Each of plurality of push-rods may be movable between a default position and a retracted position. The wrench head may further include a resilient member positioned inside the housing and between the base plate and the distal end of each of the plurality of push-rods. The resilient member may be configured to bias each of plurality of push-rods is in the default position. In the retracted position, the proximal end of the each of the plurality of push-rods may be pushed against the resilient member to be received along with a portion of the resilient member by a compartment of the plurality of compartments defined at the bottom surface of the base plate.

In another embodiment, a method for operating a universal wrench is disclosed. The method may include aligning a wrench head of the universal wrench with a fastener to be operated upon. The wrench head may include a housing having an upper portion and a lower portion and a base plate positioned inside the housing towards the upper portion of the housing, the base plate having a top surface and a bottom surface. The base plate may include a plurality of compartments defined at the bottom surface of the base plate and a plurality of push-rods positioned inside the housing, each of the plurality of push-rods having a proximal end towards the upper portion of the housing and a distal end towards the lower portion of the housing. Each of plurality of push-rods is movable between a default position and a retracted position. The wrench head may further include a resilient member positioned inside the housing and between the base plate and the distal end of each of the plurality of push-rods. The resilient member may be configured to bias each of plurality of push-rods is in the default position. In the retracted position, the proximal end of each of the plurality of push-rods is pushed against the resilient member and received along with a portion of the resilient member within a compartment of the plurality of compartments defined at the bottom surface of the base plate. Aligning the wrench head with the fastener may further include contacting a distal end of the each of a set of the plurality of push-rods with a top surface of the fastener, when each of the of plurality of push-rods is in the default position. The method may further include pressing the wrench head against the top surface of the fastener to cause the set of the plurality of push-rods to move from the default position to the retracted position and receive the fastener in a region created upon moving of the set of the plurality of push-rods from the default position to the retracted position. The method may further include applying a torque to the wrench head to cause rotation of the wrench head and thereby the fastener.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Figure 1A:
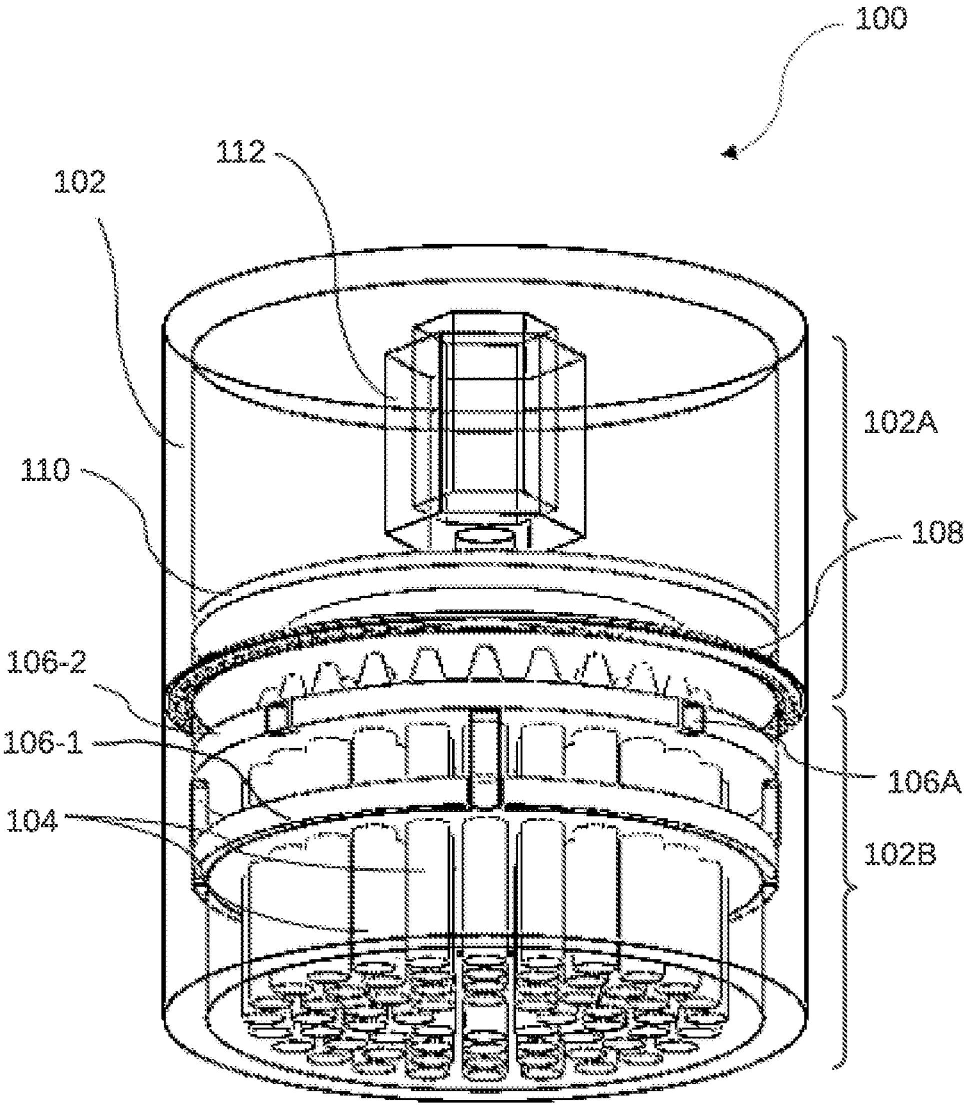
FIG. 1A-1B illustrates a perspective view and a front view, respectively of a wrench head for a universal wrench, in accordance with an embodiment of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed.

In an embodiment, a wrench head for a universal wrench to facilitate tightening or loosening of the fasteners of different shapes and sizes is disclosed. Wrenches are used to tighten or loosen various types of fasteners, such as nuts and bolts, as well as conduits and pipe fittings in a variety of applications. Wrenches are typically made up of a two-part body with a handle and a wrench head. The handle may be designed to offer a user enough grip and span when the wrench is in operation. The handle may have a provision for locking to the wrench head. The handle may be preferably made of cast iron or a metal alloy to provide adequate strength to the wrench and to extend its life.

During operation of the wrench, the head of the wrench plays a crucial role. The head may have a socket that is suited to receive the engaging portion of the modular torque handle, allowing the handle to be permanently secured to the head. The head is a longitudinal chamber designed to receive various components to facilitate firm grasping of the fastener head.

The wrench head may include a housing being defined as a longitudinal chamber. The housing may preferably have a cylindrical shape to occupy the minimum area around the fastener head. The wrench head may include a plurality of push-rods, a pair of push-rod locators, a resilient member, and a base plate. Each of the plurality of push-rods may have a proximal end towards the upper portion of the housing and a distal end towards the lower portion of the housing, and each of the plurality of push-rods is movable between a default position and a retracted position. The extent of the movement of the push-rods may be determined by the size of the fastener being worked on. The plurality of push-rods may be configured to pass through apertures defined on the pair of push-rod locators. The plurality of push-rods may be received in the open end of the wrench head so that one end of the plurality of push-rods is in close proximity to a resilient member and the other end is in contact with the fastener head to be turned. The plurality of apertures provided on each of the pair of push-rod locators may be adapted to receive each of the plurality of push-rods. The pair of push-rod locators may also facilitate precise linear movement of the plurality of push-rods in the vertical direction when the resilient member is in the retracted position.

The resilient member may be located within the housing, between the base plate and the distal end of each of the push-rods to bias each of plurality of push-rods when they are in the default position. The resilient member may be formed with a plurality of grooves to enhance the stiffness of the resilient member and prevent lagging of the resilient member after prolonged working conditions. The resilient member may be designed in such a way that mounting the resilient member inside the housing does not necessitate the use of any special tools. Furthermore, the resilient member can be easily replaced with a different resilient member depending on the requirements of the application.

The base plate may be positioned inside the housing towards the upper portion of the housing, above the resilient member to support the resilient member during working conditions. The base plate may be formed as a separate structure and is removably attached to the housing. Alternately, the base plate and the resilient member may be integrally formed to have a unitary structure. The base plate may be preferably made up of any rigid material like plastic, or light metal alloy. The base plate may be equipped with a plurality of compartments for receiving a specific elongated portion of the resilient member along with the push-rods in the retracted position. The plurality of compartments may be distributed in one or more concentric grooves, each of the one or more concentric grooves having one of a circular and a polygonal profile and may be configured to receive each of the plurality of push-rods. The plurality of compartments may also prevent elongation of the portion of the resilient member which is not in contact with the plurality of push-rods in the retracted position thus providing a firm grip around the fastener head during tightening or loosening of the fastener. The base plate, the resilient member, the pair of push-rod locators, and the plurality of push-rods may be removably attached to the housing of the wrench head.

Figure 1B:
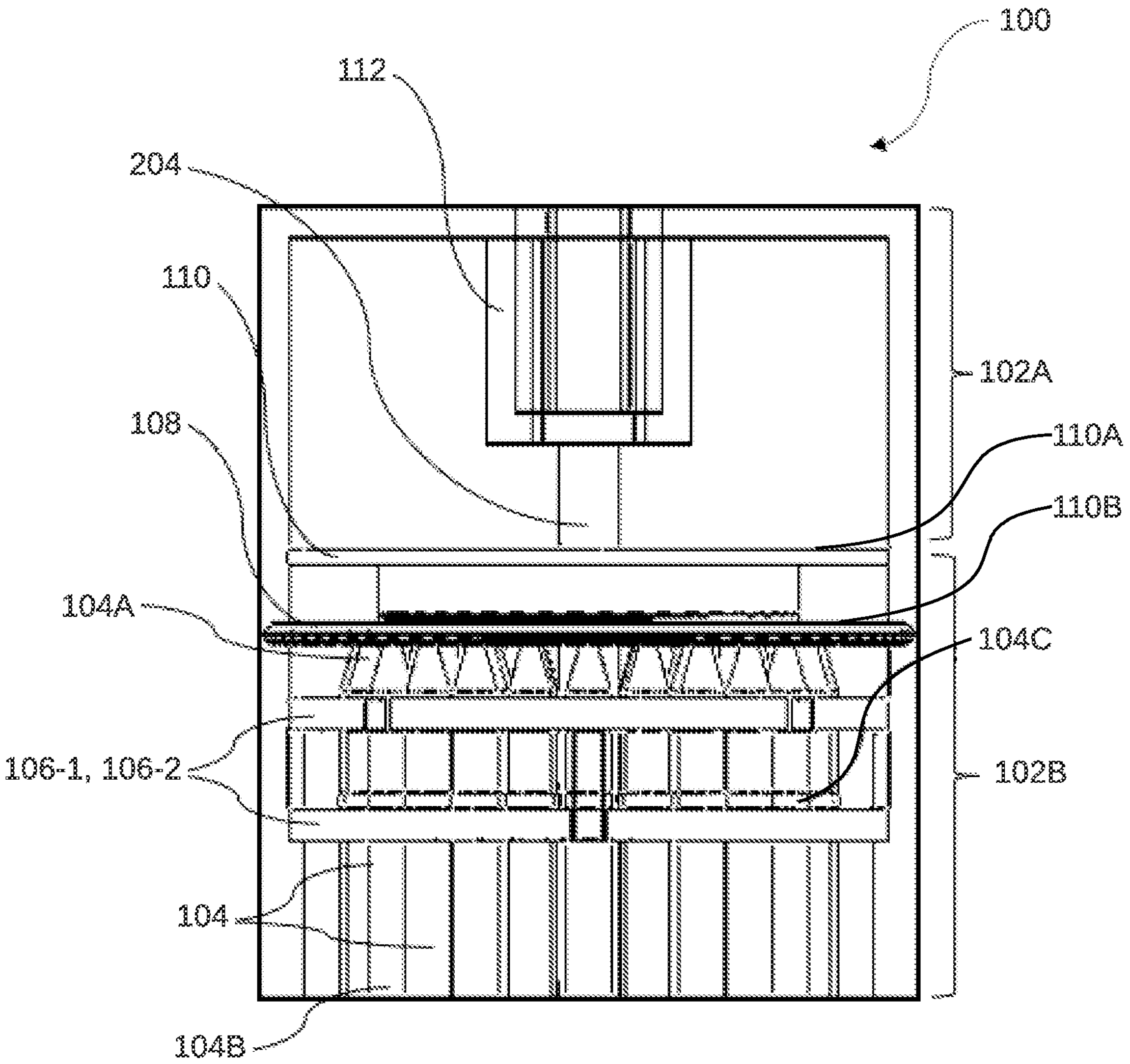

Referring now to FIGS. 1A-1B, a perspective view and a front view, respectively, of a wrench head 100 are illustrated, in accordance with an embodiment of the present disclosure. As will be understood, the wrench head 100 may be meant for a universal wrench which may be used for tightening or loosening a fastener like a nut or a bolt. In an embodiment, the wrench head 100 may include a housing 102, a plurality of push-rods 104, one or more push-rod locators 106-1, 106-2, a resilient member 108, and a base plate 110.

In an embodiment, the housing 102 may have a cylindrical shape defining an upper portion 102A and a lower portion 102B. The lower portion 102B and the upper portion 102A of the housing 102 may be removably attached to each other by mechanical means. The housing 102 of the cylindrical shape may be used for a compact construction. Further, the cylindrical-shaped housing 102 occupies lesser space around the fasteners, also makes operating the wrench head 100 easier. The housing 102 may be preferably formed from cast iron or any other suitable metal or an alloy to provide sufficient strength to the wrench head 100. The housing 102 may be preferably formed through any forming process like molding but not limited to the same.

In an embodiment, the housing 102 of the wrench head 100 may have a circular or polygonal-shaped profile. Although, it is within the purview of a person skilled in the art to modify the shape of the housing 102. The size of the housing 102 may also vary depending on the application. For example, in heavy industries, the housing 102 may be larger in size to accommodate a larger number push-rods 104 to facilitate turning of large fasteners.

The base plate 110 may be positioned inside the housing towards the upper portion 102A of the housing 102. As shown in FIG. 1B, the base plate 110 may define a top surface 110A and a bottom surface 110B.

The plurality of push-rods 104 (hereinafter, also individually referred to as push-rod 104) may be positioned inside the housing 102. As shown in FIG. 1B, each of the plurality of push-rods 104 may define a proximal end 104A towards the upper portion 102A of the housing 102 and a distal end 104B towards the lower portion 102B of the housing 102. Further, each of plurality of push-rods 104 may be movable between a default position and a retracted position. It should be noted that in the default position, as shown in FIGS. 1A-1B, the distal end 104B of the push-rod 104 may be positioned towards the lower portion 102B of the housing 102. Further, in the retracted position (as later shown in FIG. 6), the distal end 104B of the push-rod 104 may be positioned somewhat away from the lower portion 102B end of the housing 102 and towards the upper portion 102A of the housing 102. It should be noted that the retracted position may be obtained when the wrench head is pressing against a top surface of a fastener thereby causing a set of the plurality of push-rods 104 to move away from the default position (to the retracted position) in order to receive the fastener in a region created upon moving of the set of the plurality of push-rods from the default position (to the retracted position).

It should be noted that each of the plurality of push-rods 104 may have a circular or a polygonal (e.g. hexagonal) cross section. Further, each of the plurality of push-rods 104 may be made from a metal, an alloy, or ay rigid material having sufficient strength and hardness to bear the load due to wrench operations. The plurality of push-rods 104 may be stacked together in contact with each other, or with some gap between evert two push-rods 104.

The resilient member 108 may be positioned inside the housing 102 and between the base plate 110 and the proximal end 104A of each of the plurality of push-rods 104. The resilient member 108 is configured to have high flexibility and high strength. As such, in some example embodiments, the resilient member 108 may be manufactured from a suitable elastic polymer-based material.

In some embodiments, the proximal end 104A of each of the push-rod 104 may be defined as having a fulcrum-shaped structure to exert compression forces onto the specific portion of the resilient member 108, in the retracted position. The distal end 104B may be defined as an end surface opposite to the proximal end 104A and configured to get in contact with a fastener head of the fastener to be operated on (e.g., a fastener head 202A of the fastener 202, as later shown in FIG. 6) in the retracted position. Further, the distal end 104B of each of the plurality of push-rods 104 may be defined with a profile so as to provide sufficient friction (i.e. grip) between the fastener head and the push-rods 104. The distal end 104B may have a flat surface but not limited to the same, to provide sufficient friction between the fastener head and the push-rods 104. Therefore, in the retracted position of the plurality of push-rods 104, the wrench head 100 facilitates tightening or loosening of the fastener 202.

The one or more push-rod locators 106-1, 106-2 may be positioned inside the housing 102. In an embodiment, the one or more push-rod locators 106-1, 106-2 may be positioned vertically below the resilient member 108. Further, in an embodiment, the one or more push-rod locators 106-1, 106-2 may include two separate push-rod locators, i.e. a push-rod locator 106-1 and a push-rod locator 106-2. In such an embodiment, the push-rod locator 106-1 and the push-rod locator 106-2 may be spaced apart from each other by a pre-determined distance. For example, the amount of linear movement of the push-rods 104 in moving between the default position and the retracted position may depend on the predetermined distance between the push-rod locator 106-1 and the push-rod locator 106-2.

As will be understood, the amount of linear movement of the push-rods 104 between the default position and the retracted position must be sufficient to receive the entire fastener head (in the retracted position of the push-rods 104), to sufficiently grip the fastener heads of various sizes. As will be appreciated by those skilled in the art, the distance between the push-rod locator 106-1 and the push-rod locator 106-2 may vary to accommodate fasteners having larger and/or smaller heads.

Figure 1C:
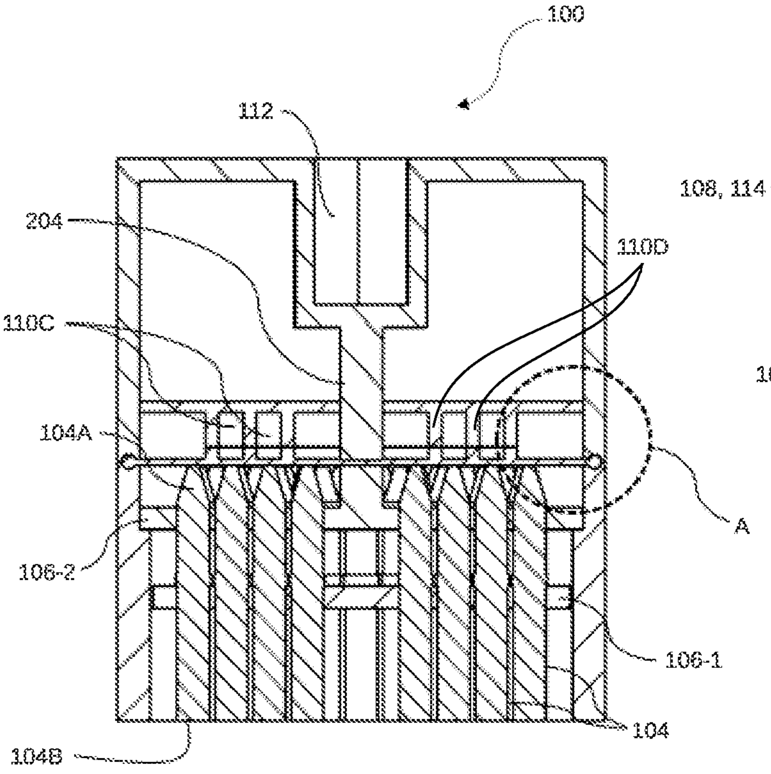
FIG. 1C-1D illustrates a sectional front view of the wrench head and a magnified view of a section of the wrench head of FIG. 1C, respectively, in accordance with an embodiment of the present disclosure.

Referring now to FIG. 1C, a sectional front view of the wrench head 100 is illustrated, in accordance with an embodiment of the present disclosure. As shown in FIG. 1C, the base plate 110 may include a plurality of compartments (the compartments are illustrated in FIG. 2B) defined at the bottom surface 110B of the base plate 110, by a plurality of separating walls 110D. By way of an example, the plurality of separating walls 110D may be formed within the bottom surface 110B of the base plate 110 during manufacturing of the base plate 110. Additionally, the bottom surface 110B may be manufactured and then attached to the base plate 110. As will explained in subsequent sections, the plurality of compartments may be distributed in one or more concentric grooves, each of the one or more concentric grooves having one of a circular and a polygonal profile.

The resilient member 108 is configured to bias each of plurality of push-rods 104 in the default position. In the retracted position, the proximal end 104A of the each of the plurality of push-rods 104 may be pushed against the resilient member 108. As a result, the proximal end 104A of the each of the plurality of push-rods 104 is received along with a portion of the resilient member 108 in a compartment of the plurality of compartments defined at the bottom surface 110B of the base plate 110.

Further, in an embodiment, the resilient member 108 may include a plurality of grooves corresponding to the plurality of compartments defined at the bottom surface 110B of the base plate 110. A portion of the resilient member 108 may be configured to be received by a compartment of the plurality of compartments 110C defined at the bottom surface of the base plate.

Figure 1D:
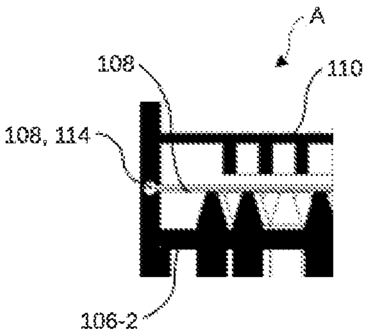

Referring now to FIG. 1D, a magnified view of a section A of the wrench head 100 of FIG. 1C is illustrated, in accordance with an embodiment of the present disclosure. In an embodiment, as shown in FIG. 1D, the resilient member 108 may include a rim 108A defined along a periphery of the resilient member 108. The resilient member 108 may be fitted inside the housing 102 via the rim 108A. To this end, the housing 102 may further include a circumferential slot 114 defined along an inside periphery of the housing 102. The resilient member 108 therefore may be secured inside the circumferential slot 114, by positioning the rim 108A within slot circumferential 114. The rim 108A may have a circular, oval, or polygonal shaped cross-section, to be received inside the similar-shaped circumferential slot 114 defined in the housing 102. The resilient member 108 may be preferably mounted on the housing 102 in a snap-fit manner to prevent dislocation of the resilient member 108, during operation. In some embodiments, the circumferential slot 114 may be defined on the lower portion of the housing 102. Further, in some embodiments, the resilient member 108 may be mounted at an intermediate portion of the housing 102, i.e. at the intersection of the upper portion 102A and the lower portion 102B of the housing 102. the but not limited to the same.

Figure 2A:
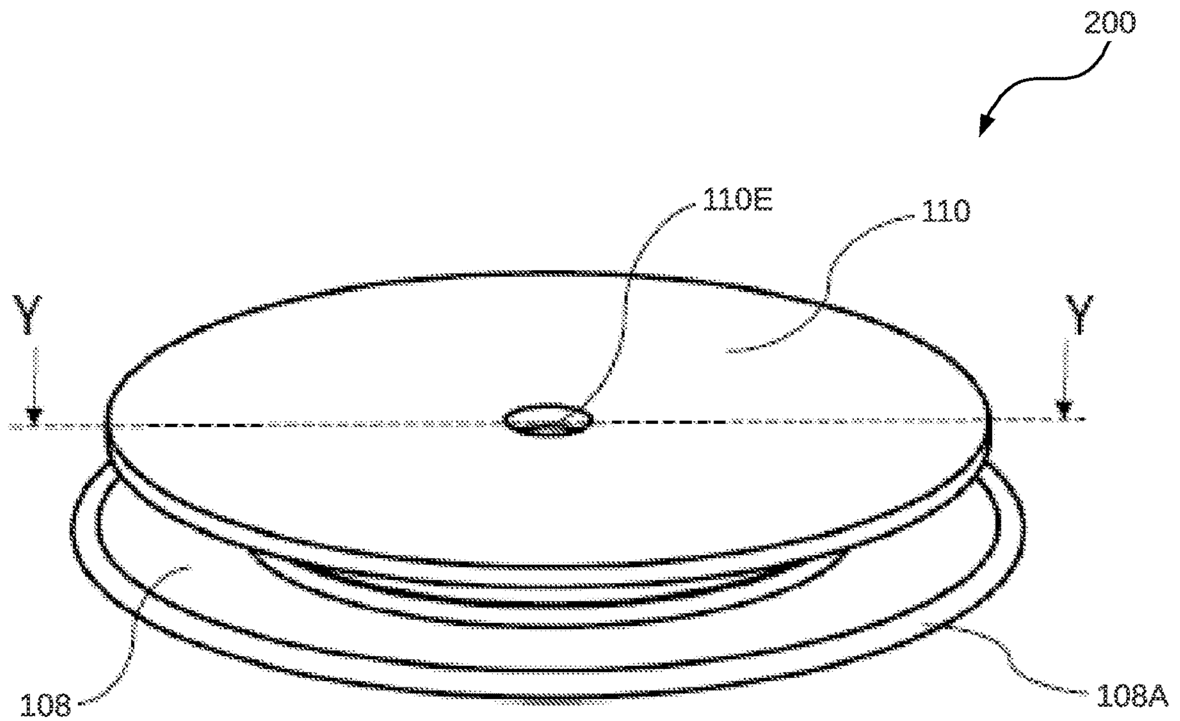
FIGS. 2A-2B illustrate a perspective view and a sectional front view (along a line Y-Y), respectively of an assembly of a base plate and a resilient member of the wrench head, in accordance with some embodiments of the present disclosure.
Figure 2B:
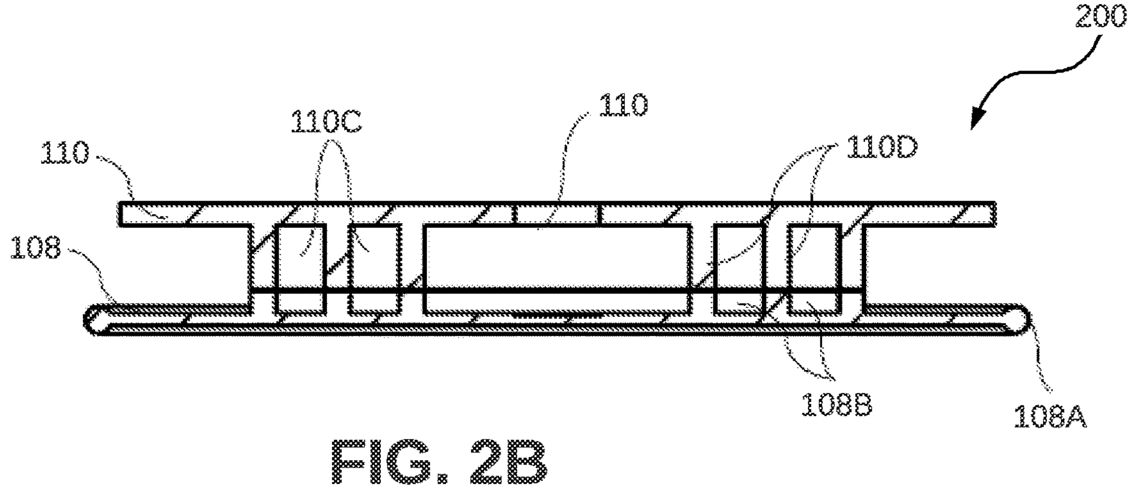

Referring now to FIG. 2A, a perspective view of an assembly 200 of the resilient member 108 and the base plate 110 is illustrated, in accordance with an embodiment of the present disclosure. FIG. 2B illustrates a front section of the assembly 200 along a section line Y-Y (as shown in FIG. 2A), in accordance with an embodiment of the present disclosure. In some embodiments, the resilient member 108 may be integrally formed with the base plate 110. Alternately, the resilient member 108 and the base plate 110 may be separate individual elements.

As mentioned above, the base plate 110 may be positioned inside the housing 102 towards the upper portion 102A of the housing 102. The base plate 110 may define the top surface 110A and the bottom surface 110B. As shown in FIG. 2A, the bottom surface 110B may define a plurality of compartments 110C. The plurality of compartments 110C may be defined by a plurality of separating walls 110D defined on the bottom surface 110B. The separating walls 110D may prevent transmission of force from the specific portion of the resilient member 108 which is in contact with the plurality of push-rods 104, to the remaining portion of the resilient member 108.

The base plate 110 may further include a central hole 110E to facilitate mounting of the base plate 110 inside the housing 102 of the wrench head 100. A longitudinal shaft 204 may extend from a bottom surface of a socket 112 to receive the central hole 110E provided on the base plate 110. The socket 112 may be provided on the upper portion 102A of the housing 102 to receive a handle for operating the wrench head 100. The socket 112 may preferably include a polygonal-shaped slot (not shown in FIGS. 2A-2B) to secure the wrench head 100 with the handle of the wrench. The mounting of the handle with the wrench head 100 may be obtained using a locking pin mechanism which may lock an outwardly biased pin provided in the handle with the slot provided in the socket 112. The socket 112 may extend from an upper surface of the upper portion 102A of the housing 102 partially towards a lower surface of the upper portion 102A of the housing 102.

By way of example, the base plate 110 may cover the entire surface of the resilient member 108 to facilitate the smooth operation of the wrench head 100. The base plate 110 may be made from any rigid material for example plastic or any other lightweight metal alloy to provide sufficient strength. The plurality of compartments 110C defined on the bottom surface 110B may be configured to receive a specific elongated portion of the resilient member 108, during the linear movement of the respective push-rods 104.

The resilient member 108 may be positioned inside the housing 102 and between the base plate 110 and the proximal end 104A of each of the plurality of push-rods 104. Further, the resilient member 108 may include a plurality of grooves 108B (shown as indentations in the cross sectional view in FIG. 2B) corresponding to the plurality of compartments 110C. The plurality of grooves 108B may provide for enhancing the stiffness of the resilient member 108, and further preventing lagging of the resilient member 108 after prolonged working conditions. Further, the plurality of comportments 110C may be distributed in one or more concentric grooves.

Figure 3A:
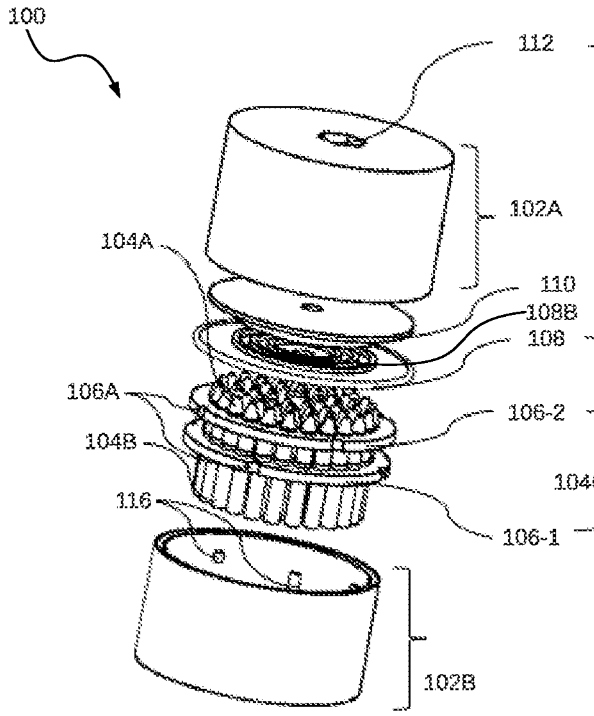
FIGS. 3A-3B illustrate two exploded views of the wrench head of FIGS. 1A-1D, in accordance with an embodiment of the present disclosure.
Figure 3B:
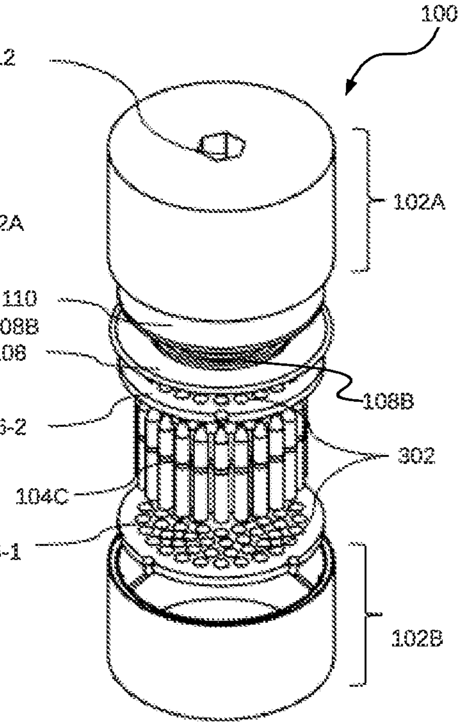

Referring now to FIGS. 3A-3B, exploded views of the wrench head 100 are illustrated, in accordance with some embodiments of the present disclosure. As shown in FIGS. 3A-3B, and as already explained above, the wrench head 100 includes the housing 102, the plurality of push-rods 104, the push-rod locators 106-1, 106-2, the resilient member 108, and the base plate 110. The housing may include the upper portion 102A and the lower portion 102B. The housing 102 may include one or more locking knobs 116 defined on the lower portion 102B of the housing 102, to engage with the push-rod locators 106-1,106-2, in order to secure a positioning of the push-rod locators 106-1, 106-2 within the housing 102. One or more locking knobs 116 may be defined along a circumferential periphery corresponding each of the push-rod locators 106-1,106-2. Further, the distance between the circumferential peripheries corresponding to the two push-rod locators 106-1, 106-2 may be in accordance with the distance to be kept between the pair of push-rod locators 106-1, 106-2.

The base plate 110 may define the top surface 110A and the bottom surface 110B may and be positioned inside the housing 102 towards the upper portion 102A of the housing 102. Further, the plurality of push-rods 104 are positioned inside the housing 102, with the proximal end 104A towards the upper portion 102A of the housing 102 and the distal end 104B towards the lower portion 102B of the housing 102. Each of the plurality of push-rods 104 is movable between the default position and the retracted position. Each of the plurality of push-rods 104 may have a circular or a polygonal (e.g. hexagonal) cross section. Further, the plurality of push-rods 104 may be stacked together in contact with each other, or with some gap between evert two push-rods 104.

The resilient member 108 is positioned inside the housing 102, between the base plate 110 and the proximal end 104A of each of the plurality of push-rods 104. The resilient member 108 is configured to bias each of plurality of push-rods 104 in the default position. Further, as shown in FIGS. 3A-3B, in an embodiment, the resilient member 108 may include the plurality of grooves 108B corresponding to the plurality of compartments 110C defined at the bottom surface 110B of the base plate 110. Each of the plurality of grooves 108B may have a circular profile or a polygonal profile. A portion of the resilient member 108 may be configured to be received by a compartment of the plurality of compartments 110C, during movement of a respective push-rod 104 from the default position to the retracted position. Furthermore, the plurality of compartments 110C may be distributed in one or more concentric grooves. Each of the one or more concentric grooves may have a circular and a polygonal profile. The one or more concentric grooves are further explained in conjunction with FIGS. 4-5.

Figure 4:
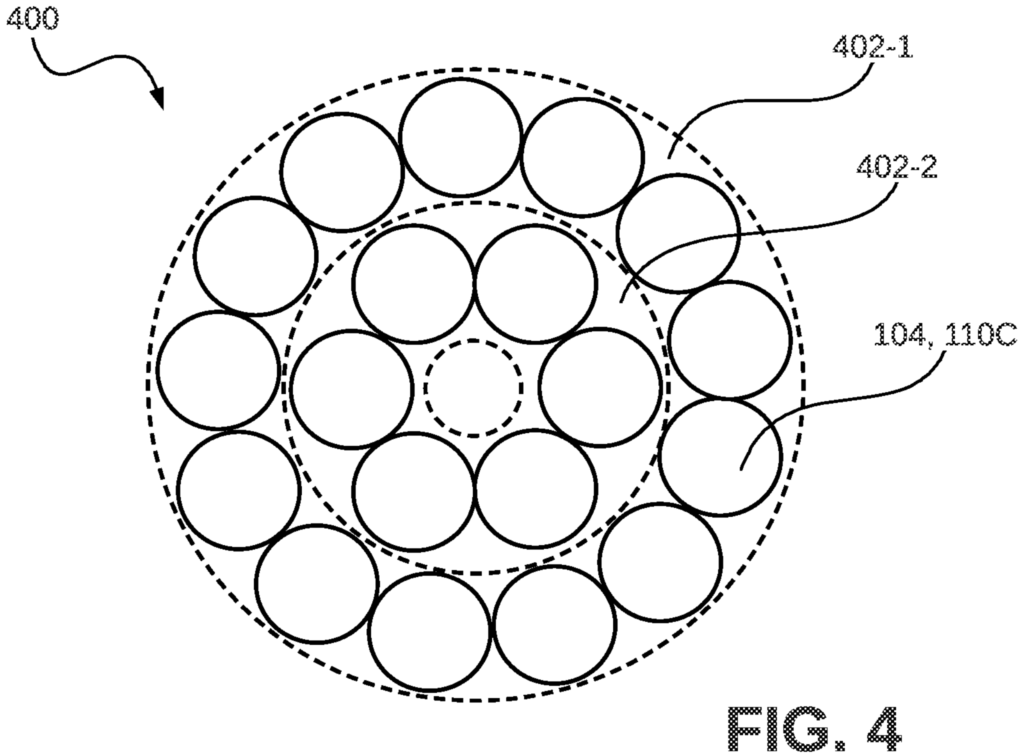
FIGS. 4-5 illustrate bottom views of bottom surfaces of two base plates defining concentric grooves having circular configuration and hexagonal configuration, respectively, in accordance with an embodiment of the present disclosure.
Figure 5:
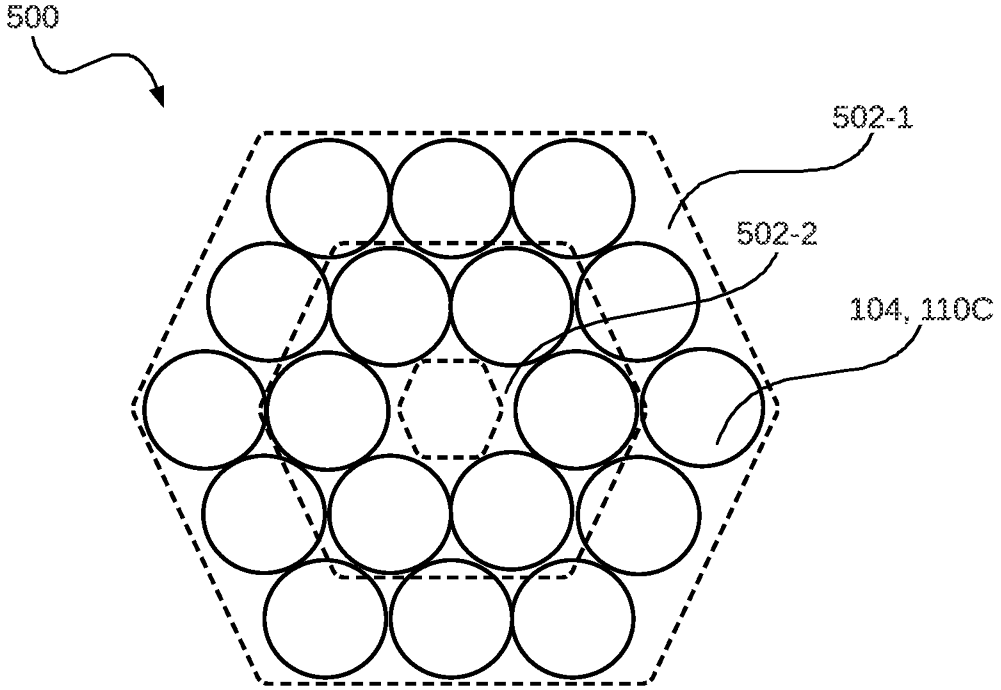

Referring now to FIG. 4, a bottom view of an example bottom surface of a base plate 400 (corresponding to the base plate 110) defining concentric grooves having circular configuration is illustrated, in accordance with an embodiment of the present disclosure. FIG. 5 illustrates a bottom view of an example bottom surface of a base plate 500 (corresponding to the base plate 110) defining concentric grooves having hexagonal configuration, in accordance with another embodiment of the present disclosure. As shown in FIG. 4, the base plate 400 may include the plurality of compartments 110C which are distributed in one or more concentric grooves 402-1, 402-2 (defined within dotted lines), each having a circular configuration. Each of the compartments 110C may accommodate a push-rod 104. As will be understood, only two concentric grooves 402-1, 402-2 are shown in FIG. 4 for explanation, however, the base plate 400 may include a greater number of compartments and hence a greater number of concentric grooves. Similarly, as shown in FIG. 5, the base plate 500 may include the plurality of compartments 110C which are distributed in one or more concentric grooves 502-1, 502-2 (defined within dotted lines), each having a hexagonal configuration. Each of the compartments 110C may accommodate a push-rod 104. The base plate 500 may have a greater number of compartments and hence a greater number of concentric grooves as well.

Referring back to FIGS. 3A-3B, it should be noted that proximal end 104A of each of the push-rod 104 may be defined as having a fulcrum-shaped structure to exert compression forces onto the specific portion of the resilient member 108, in the retracted position. The distal end 104B may be defined as an end surface opposite to the proximal end 104A and configured to get in contact with a fastener head of the fastener to be operated on (e.g., fastener head 202A of the fastener 202, as later shown in FIG. 6) in the retracted position. Therefore, in the retracted position of the plurality of push-rods 104, the wrench head 100 facilitates tightening or loosening of the fastener 202.

Each of the push-rod locator 106-1 and the push-rod locator 106-2 may include plate having a plurality of apertures 302. In other words, each of the push-rod locator 106-1 and the push-rod locator 106-2 may define a plurality of apertures 302 allowing each of the plurality of push-rods 104 to pass through it. The plurality of apertures 302 may be formed relative to an outer diameter of each of the plurality of push-rods 104, providing minor clearance between the outer surface of the push-rods 104 and the internal wall of the apertures 302 to facilitate linear movement of the push-rods 104 through each of the two push-rod locators 106-1, 106-2.

In an embodiment, each of the plurality of push-rods 104 may include a collar 104C. For example, the collar 104C may be a protruding formation on the surface of each push-rod 104. The collar 104C may be configured to abut against the surface surrounding the apertures 302 of one of the push-rod locators 106-1, 106-2. This is to prevent excessive linear movement of the push-rod 104 passing through the pair of push-rod locators 106-1, 106-2, when the push-rods perform the linear movement between the default position and the retracted position.

In an embodiment, each of the push-rod locators 106-1, 106-2 may include one or more locking grooves 106A. The locking grooves 106A may be adapted to be received in the locking knobs 116 provided on the lower portion 102B of the housing 102. The locking knobs 116 received inside the locking grooves 106A may prevent abrupt linear as well as rotational movement of the push-rod locators 106-1, 106-2 during the retracted and default position of the wrench head 100.

In an embodiment, the resilient member 108 may be configured to bias the plurality of push-rods 104 in the default position. As mentioned above, the resilient member 108 may be of the shape and size of the housing 102 and may have one of a circular or a polygonal shape profile. The structure of the resilient member 108 may vary with respect to the structure of the housing 102, to facilitate proper mounting of the resilient member 108 within the housing 102. The resilient member 108 may be manufactured from an elastic polymer-based material like—rubber, polymers, etc. The rim 108A defined along the periphery of the resilient member 108 may have a higher cross-section at the edge-periphery (i.e. along the rim 108A) as compared to its inner portion. The thickness of the resilient member 108 may be considered as one of the parameters for determining the sufficient stiffness of the resilient member 108. Further, the thickness of the resilient member 108 may be determined based on the application of the wrench head 100. Further, a ratio of the thickness of the rim 108A and the thickness of the inner portion of the resilient member 108 may also be determined based on the application of the wrench head 100.

Figure 6:
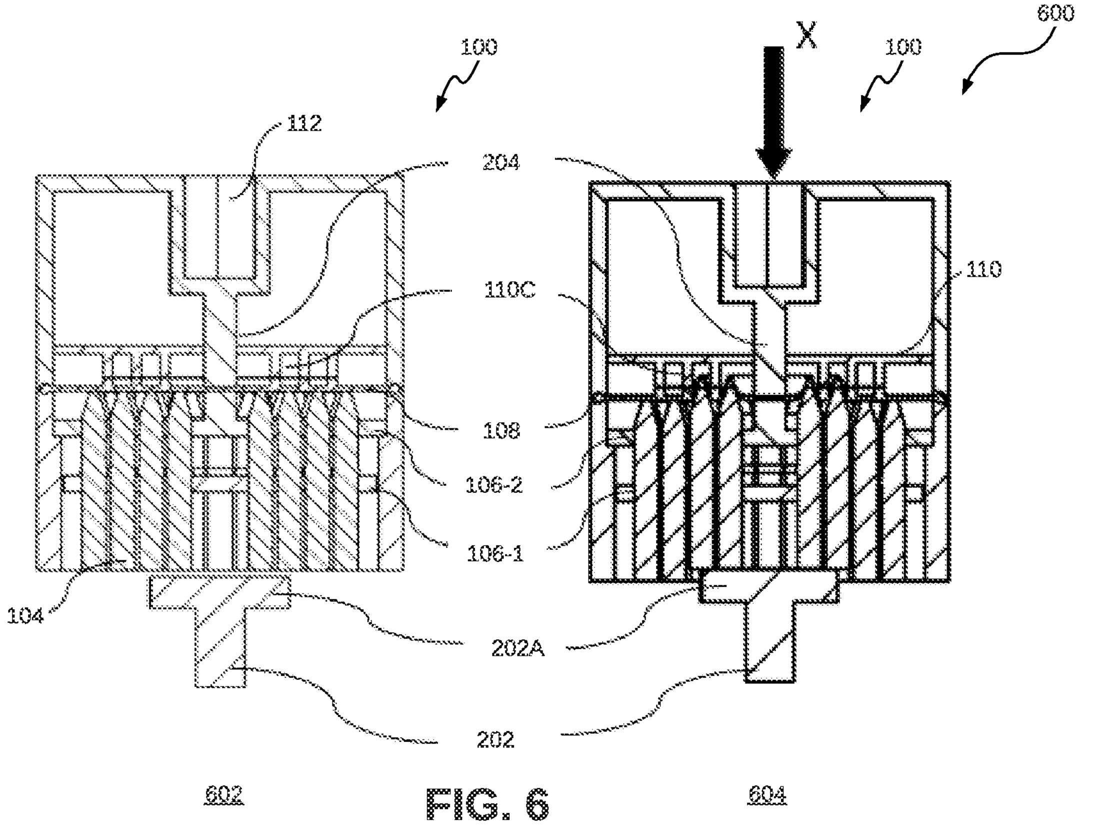
FIG. 6 illustrates a process of using the wrench head of the universal wrench, in accordance with an embodiment of the present disclosure.

Referring now to FIG. 6, a process flow diagram of a process 600 of operating a universal wrench via the wrench head 100 is illustrated, in accordance with an embodiment. At step 602, the wrench head 100 may be aligned with a fastener head 202A of a fastener 202 to be operated upon. As already explained in conjunction with FIGS. 1-5, the wrench head 100 includes housing 102 having the upper portion 102A and the lower portion 102B. The wrench head 100 further includes the base plate 110 positioned inside the housing 102 towards the upper portion 102A of the housing 102. The base plate 110 defines having a top surface 110A and a bottom surface 110B. The base plate 110 includes the plurality of compartments 110C defined at the bottom surface 110B of the base plate 110. The wrench head 100 further includes the plurality of push-rods 104 positioned inside the housing 102. Each of the plurality of push-rods 104 has a proximal end 104A towards the upper portion 102A of the housing 102 and a distal end 104B towards the lower portion 102B of the housing 102. Each of plurality of push-rods 104 is movable between the default position and the retracted position. The wrench head 100 further includes the resilient member 108 positioned inside the housing 102 and between the base plate 110 and the distal end 104B of each of the plurality of push-rods 104. The resilient member 108 is configured to bias each of plurality of push-rods 104 in the default position. It should be noted that each of plurality of push-rods 104 is in the default position, as step 602. It should be further noted wherein in the retracted position, the proximal end 104A of each of the plurality of push-rods 104 may be pushed against the resilient member 108 and received along with a portion of the resilient member 108 within a compartment of the plurality of compartments 110C defined at the bottom surface 110B of the base plate 110.

Further, at step 602, in order to align the wrench head 100 with the fastener 202, a distal end 104B of the each of a set of the plurality of push-rods 104 is contacted with a top surface (i.e. fastener head 202) of the fastener 202.

At step 604, the wrench head 100 is pressed against the top surface (i.e. fastener head 202) of the fastener 202 to cause the set of the plurality of push-rods 104 to move from the default position to the retracted position. As will be appreciated. the presence of the separating walls 110D between the compartments 110C may prevent the resilient member 108 from elongating excessively, hence restricting the linear movement of the remaining push-rods 104 that are not in contact with the fastener head 202A. The remaining push-rods 104 circumscribe the fastener head 202A of the fastener 202 providing a rigid grip in the retracted position of the push-rods 104. As the set of the plurality of push-rods 104 move from the default position to the retracted position, a region created in the space vacated by the movement of the set of the plurality of push-rods 104. Further, the fastener 202 is received in this region.

Further, at step 604, a torque may be applied to the wrench head 100 to cause rotation of the wrench head 100 and thereby the fastener 202. To this end, housing 102 may further include a torque handle (not shown in FIG. 6) fitted to the housing 102 at the upper portion 102A of the housing 102. The torque may be applied to the wrench head 100 using the torque handle. Alternately, the housing 102 may include the socket 112 to receive an engaging portion of a modular torque handle.

The above subject matter discloses a wrench head which is capable of operating on various differently shaped and sized fasteners, thereby avoiding or reducing repeated replacement of the wrench heads. The above wrench head includes a fewer number of assembling parts, that are easily replaceable, thereby reducing the overall manufacturing and operating cost of the wrench. Further, the wrench provides for a portable solution. Moreover, by employing the resilient member, the construction and therefore the manufacturing of the is simplified.

It is intended that the disclosure and examples be considered as exemplary only, with a true scope and spirit of disclosed embodiments being indicated by the following claims.

I claim:

1. A wrench head comprising:

a housing having an upper portion and a lower portion;

a base plate positioned inside the housing towards the upper portion of the housing, the base plate having a top surface and a bottom surface, wherein the base plate comprises:

a plurality of compartments defined at the bottom surface of the base plate;

a plurality of push-rods positioned inside the housing, each of the plurality of push-rods having a proximal end towards the upper portion of the housing and a distal end towards the lower portion of the housing, wherein each of plurality of push-rods is movable between a default position and a retracted position; and a resilient member positioned inside the housing and between the base plate and the proximal end of each of the plurality of push-rods, wherein the resilient member is configured to bias each of plurality of push-rods in the default position, and wherein in the retracted position, the proximal end of the each of the plurality of push-rods is pushed against the resilient member to be received along with a portion of the resilient member in a compartment of the plurality of compartments defined at the bottom surface of the base plate.

2. The wrench head of claim 1, further comprising:

at least one push-rod locator positioned inside the housing and vertically below the resilient member, wherein the at least one push-rod locator comprises:

a plate having a plurality of apertures;

wherein each of the plurality of push-rods is configured to pass through an associated aperture of the plurality of apertures.

3. The wrench head of claim 1, wherein the resilient member comprises a rim defined along a periphery of the resilient member.

4. The wrench head of claim 1, wherein the housing further comprises:

a slot defined along an inside periphery of the housing, wherein the resilient member is configured to be secured inside the slot, by positioning the rim within slot.

5. The wrench head of claim 1, wherein the resilient member is manufactured from an elastic polymer-based material.

6. The wrench head of claim 1, wherein the resilient member comprises a plurality of grooves corresponding to the plurality of compartments defined at the bottom surface of the base plate.

7. The wrench head of claim 1, wherein the plurality of compartments are distributed in one or more concentric grooves, each of the one or more concentric grooves having one of a circular and a polygonal profile.

8. The wrench head of claim 1, wherein each of the housing, the base plate, the resilient member, and the at least one push-rod locator has one of a circular or and a polygonal profile.

9. A method for operating a universal wrench, the method comprising:

aligning a wrench head of the universal wrench with a fastener to be operated upon, wherein the wrench head comprises:

a housing having an upper portion and a lower portion;

a base plate positioned inside the housing towards the upper portion of the housing, the base plate having a top surface and a bottom surface, wherein the base plate comprises:

a plurality of compartments defined at the bottom surface of the base plate;

a plurality of push-rods positioned inside the housing, each of the plurality of push-rods having a proximal end towards the upper portion of the housing and a distal end towards the lower portion of the housing, wherein each of plurality of push-rods is movable between a default position and a retracted position; and a resilient member positioned inside the housing and between the base plate and the distal end of each of the plurality of push-rods, wherein the resilient member is configured to bias each of plurality of push-rods is in the default position, and wherein in the retracted position, the proximal end of each of the plurality of push-rods is pushed against the resilient member and received along with a portion of the resilient member within a compartment of the plurality of compartments defined at the bottom surface of the base plate;

wherein aligning the wrench head with the fastener comprises:

contacting a distal end of the each of a set of the plurality of push-rods with a top surface of the fastener, when each of the of plurality of push-rods is in the default position;

pressing the wrench head against the top surface of the fastener to cause the set of the plurality of push-rods to move from the default position to the retracted position and receive the fastener in a region created upon moving of the set of the plurality of push-rods from the default position to the retracted position; and applying a torque to the wrench head to cause rotation of the wrench head and thereby the fastener.

10. The method of claim 9, wherein the housing further comprises one of:

a torque handle fitted to the housing at the upper portion of the housing, wherein the torque to the wrench head is applied using the torque handle; or a socket to receive an engaging portion of a modular torque handle.

* * * * *